United States Patent
Robinson et al.

(10) Patent No.: US 9,575,792 B2
(45) Date of Patent: Feb. 21, 2017

(54) METHOD AND SYSTEM FOR REPLICATING VIRTUAL MACHINES

(71) Applicant: NETAPP, INC., Sunnyvale, CA (US)

(72) Inventors: Matthew Douglas Robinson, Sunnyvale, CA (US); Keith Tenzer, Munich (DE)

(73) Assignee: NETAPP, INC., Sunnyvale, CA (US)

( * ) Notice: Subject to any disclaimer, the term of this patent is extended or adjusted under 35 U.S.C. 154(b) by 78 days.

(21) Appl. No.: 14/211,446

(22) Filed: Mar. 14, 2014

(65) Prior Publication Data
US 2015/0261558 A1 Sep. 17, 2015

(51) Int. Cl.
*G06F 9/455* (2006.01)
*G06F 11/14* (2006.01)

(52) U.S. Cl.
CPC ....... *G06F 9/45558* (2013.01); *G06F 11/1458* (2013.01); *G06F 11/1456* (2013.01); *G06F 2009/4557* (2013.01); *G06F 2009/45562* (2013.01); *G06F 2009/45575* (2013.01); *G06F 2201/815* (2013.01); *G06F 2201/84* (2013.01)

(58) Field of Classification Search
CPC ............. G06F 9/45558; G06F 2009/45562; G06F 2009/4557; G06F 2009/45575
USPC ............................................................. 718/1
See application file for complete search history.

(56) References Cited

U.S. PATENT DOCUMENTS

| | | | |
|---|---|---|---|
| 8,826,276 B1* | 9/2014 | Li | G06F 9/4843 709/226 |
| 2006/0041761 A1* | 2/2006 | Neumann | G06F 21/32 713/189 |
| 2009/0113109 A1* | 4/2009 | Nelson | G06F 11/203 711/6 |
| 2010/0070725 A1* | 3/2010 | Prahlad et al. | 711/162 |
| 2012/0159478 A1* | 6/2012 | Spradlin et al. | 718/1 |
| 2014/0149695 A1* | 5/2014 | Zaslavsky et al. | 711/162 |
| 2015/0177997 A1* | 6/2015 | Warszawski | G06F 9/45558 711/162 |

* cited by examiner

*Primary Examiner* — Li B Zhen
*Assistant Examiner* — Sen Chen
(74) *Attorney, Agent, or Firm* — Klein, O'Neill & Singh, LLP

(57) ABSTRACT

Methods and systems for replicating a virtual machine and its associated data containers are provided. The virtual machine is placed in an inactive state and a replication directory is generated for cloning each data container from an active directory to the replication directory. The clone of each data container references a physical location where data associated with each data container is stored; and thereafter, the virtual machine is placed in an active state after the cloning is completed.

18 Claims, 8 Drawing Sheets

METHOD AND SYSTEM FOR REPLICATING VIRTUAL MACHINES

TECHNICAL FIELD

The present disclosure relates to replicating virtual machines in a virtual machine environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are being used extensively in virtual environments where a physical resource is time-shared among a plurality of independently operating processor executable virtual machines. Typically, storage space is presented to a virtual machine as a virtual hard disk (VHD) file. A storage drive (for example, C:\) is then presented to a user via a user interface within a virtual machine context. The user can use the storage drive to access storage space to read and write information.

Replicating (or backing-up, used interchangeably throughout this specification) virtual machines today is challenging. Conventional techniques today use snapshot technology to replicate (or backup, used interchangeably throughout this specification) virtual machines and the associated files. A snapshot is a point in time copy of a storage volume at any given time.

Snapshot technology has inherent limitations because typically, a storage system allows a fixed number of snapshots (for example, 255) for a logical storage container that may have hundreds or thousands of virtual machines. The VMs may not all be replicated at the same time because they may be assigned to different clients, business groups and others. As an example, assume that there are 100 VMs in a storage container and assume that only 10 VMs can be replicated at the same time, then only 25 snapshots can be generated for each VM. If each VM is replicated separately, then only 2 snapshots can be generated for each VM. This is undesirable today, especially in the popular social media and cloud computing environments, where data is constantly changing and one may need more than 2 or 25 snapshots. Continuous efforts are being made to efficiently replicate virtual machines and their associated files.

SUMMARY

In one aspect, a machine implemented method for replicating a virtual machine is provided. The method includes placing the virtual machine in an inactive state for performing a replication operation to replicate the virtual machine and data containers associated with the virtual machine; and generating a replication directory for cloning each data container from an active directory to the replication directory, where the clone of each data container references a physical location where data associated with each data container is stored.

The replication directory stores metadata for the replication operation, the metadata including a list of replicated data containers and their respective storage paths, The method further includes activating the virtual machine after cloning is completed.

In another aspect, a non-transitory, machine readable storage medium storing executable instructions, which when executed by a machine, causes the machine to perform a method for replicating a virtual machine is provided. The method includes placing a virtual machine in an inactive state for performing a replication operation to replicate the virtual machine and data containers associated with the virtual machine; and generating a replication directory for cloning each data container from an active directory to the replication directory, where the clone of each data container references a physical location where data associated with each data container is stored.

The replication directory stores metadata for the replication operation, the metadata including a list of replicated data containers and their respective storage paths, The method further includes activating the virtual machine after cloning is completed.

In yet another aspect, a system is provided. The system includes a processor executing instructions out of a memory to place a virtual machine in an inactive state for performing a replication operation to replicate the virtual machine and data containers associated with the virtual machine; generate a replication directory for cloning each data container from an active directory to the replication directory, where the clone of each data container references a physical location where data associated with each data container is stored.

The replication directory stores metadata for the replication operation, the metadata including a list of replicated data containers and their respective storage paths. The virtual machine is activated after cloning is completed.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for replicating (or backing up) a virtual machine and its associated data containers are provided. The virtual machine is first quiesced (i.e. placed in an inactive state) and then a replication directory is generated for cloning each data container of the virtual machine from an active directory location to the replication directory. The replication directory also stores metadata regarding the replication such that the replicated data containers can be later restored. The clone of each data container references a physical location where data associated with each data container is stored; and thereafter, the virtual machine is unquiesced (i.e. placed in an active state) after the cloning is completed.

Figure 1A:
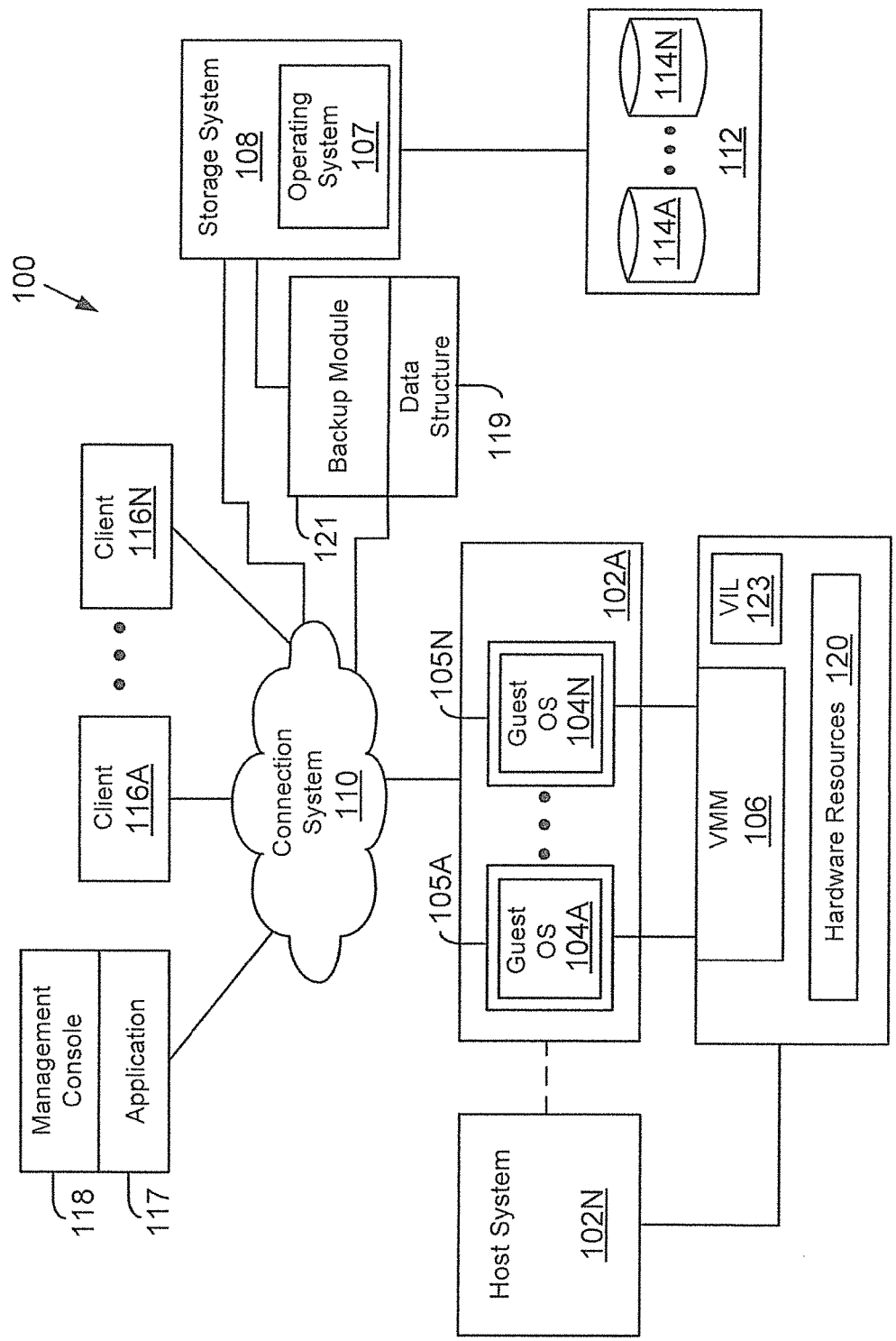
FIG. 1A shows an example of an operating environment for the various aspects disclosed herein.

System 100: FIG. 1A shows an example of a system 100, where the adaptive aspects disclosed herein may be implemented. System 100 includes a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one aspect, system 100 may include a plurality of computing systems 102A-102N (may also be referred to individually as a host platform/system 102 or server 102) communicably coupled to a storage system 108 executing a storage operating system 107 via a connection system 110 such as a local area network (LAN), wide area network (WAN), the Internet and others. As described herein, the term "communicably coupled" may refer to a direct connection, a network connection, or other connections to enable communication between devices.

Host platform 102 includes a virtual machine environment executing a plurality of VMs 105A-105N that may execute a plurality of guest OS 104A-104N (may also be referred to as guest OS 104) that share hardware resources 120. As described above, hardware resources 120 may include storage, processor, memory, I/O devices, or any other hardware resource.

In one aspect, host platform 102 interfaces with a virtual machine monitor (VMM) 106, for example, a processor executed Hyper-V layer provided by Microsoft Corporation of Redmond, Washington, a hypervisor layer provided by VMWare Inc. (without derogation of any trademark rights), or any other type. The terms Hyper-V and hypervisor are used interchangeably throughout this specification. VMM 106 presents and manages the plurality of guest OS 104A-104N executed by the host platform 102. The VMM 106 may include or interface with a virtualization interface layer (VIL) 123 that provides one or more virtualized hardware resource 120 to each OS 104A-104N.

In one aspect, VMM 106 is executed by host platform 102 with VMs 105A-105N. In another aspect, VMM 106 may be executed by an independent stand-alone computing system, often referred to as a hypervisor server or VMM server and VMs 105A-105N are presented at one or more computing systems.

It is noteworthy that in some instances, a virtualization environment may include one or more hypervisors, used independently or through a hypervisor aggregator. The generic virtualization environment described above with respect to FIG. 1A may be customized to implement the various aspects of the present disclosure. The various aspects of the present disclosure are not limited to any specific virtualization environment. Furthermore, VMM 106 may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. The management console 118 may be referred to as virtual machine management module, virtual center or "vCenter". Application 117 may be used to manage and configure VMs as well as configure resources that are used by VMs, according to one aspect.

System 100 includes a backup module 121 that interfaces with VMs, management console 118 and storage system 108 to replicate VMs and data containers for the VMs by using single instance storage (SIS) cloning, described below in detail.

Backup module 121 may be a stand-alone computing device or may be integrated with other modules. Backup module 121 uses one or more data structures 119 for managing the replication process. Details of using the backup module 121 and replicating VMs are provided below.

In one aspect, the storage system 108 has access to a set of mass storage devices 114A-114N (may be referred to as storage devices 114) within at least one storage subsystem 112. The storage devices 114 managed by the storage operating system 107 are used to store data containers (for example, files, objects, structured and unstructured data) for various VMs 105A-105N. The mass storage devices 114 may include writable storage device media such as magnetic disks, video tape, optical, DVD, magnetic tape, non-volatile memory devices for example, self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides storage volumes (also interchangeably referred to as volumes) to VMM 106 and VMs 105A-105N. A set of storage volumes may be referred to as a logical storage pool. The term storage volume or volume as used herein means a logical data set which is an abstraction of physical storage, combining one or more physical mass storage devices or parts thereof into a single logical storage object (including a logical unit number (LUN)). A storage volume whose size can be varied is referred to as a flexible storage volume (or "FlexVol"). A qtree or any sub-volume unit may also be created within a storage volume, for example, a directory qtree or any other object based storage location. As a special case, a qtree may be an entire storage volume.

Each storage volume may be configured to store data files (or data containers or data objects), scripts, word processing documents, executable programs, and any other type of structured or unstructured data. Each storage volume can represent the storage space in one storage device, an aggregate of some or all of the storage space in multiple storage devices, a RAID group, or any other set of storage space.

The storage operating system 107 may be used to store and manage information at storage devices 114 based on a client request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FOP), or Fibre Channel over Ethernet (FCoE).

In a typical mode of operation, a client (for example, a VM) transmits one or more input/output (I/O) commands, such as a CFS or NFS request, over connection system 110 to the storage system 108. Storage operating system 107 receives the request, issues one or more I/O commands to storage devices 114 to read or write the data on behalf of the client system, and issues a CIFS or NFS response containing the requested data over the network 110 to the respective client system.

In one aspect, the storage operating system 107 uses a block based file system, i.e. stores information at storage devices as blocks, for example, using, e.g., 4 kilobyte (KB) data blocks, and using "modes" to describe the data containers. An inode is a data structure, e.g., a 128-byte structure, which may be used to store information, such as meta-data, about a data container. The storage operating system 107 uses a file handle, i.e., an identifier that includes an inode number, to retrieve an inode from a storage device.

Figure 1B:
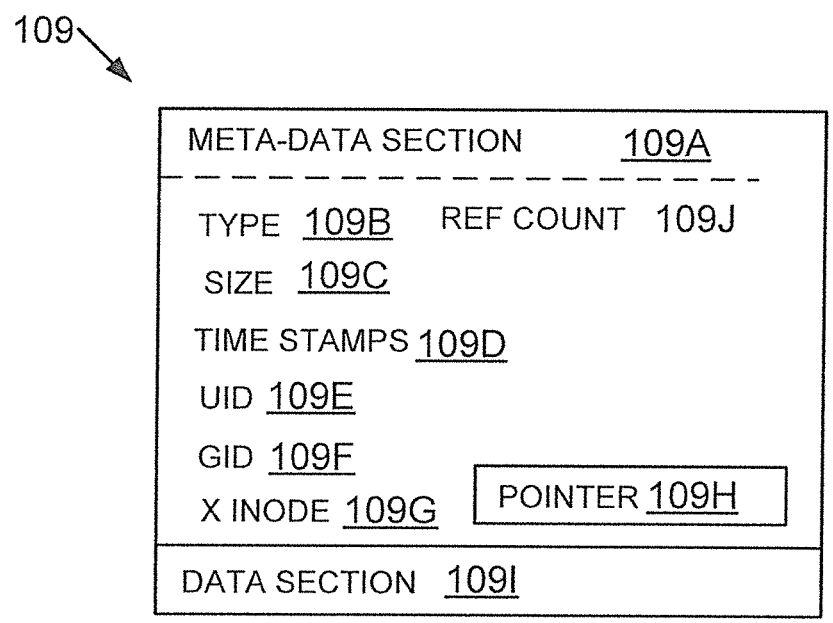
FIG. 1B shows an example of an inode maintained by a storage system used for replicating a virtual machine and data containers associated with the virtual machine, according to one aspect of the present disclosure.

FIG. 1B shows an example of an inode structure 109 (may also be referred to as inode 109) used according to one aspect. Inode 109 may include a meta-data section 109A and a data section 109I. The information stored in meta-data section 109A of each inode 109 describes a data container and, as such, may include the type (e.g., regular or directory) 109B, size 109C of the data container, time stamps (e.g., access and/or modification) 109D for the data container and ownership, i.e., user identifier (UID 109E) and group ID (GID 109F), of the data container. The metadata section 109A further includes a x-inode field 109G with a pointer 109H that references another inode structure containing, e.g., access control list (ACL) information associated with the data container or directory.

The meta-data section also includes a reference count 109J that provides a count of different data containers that may be referencing this inode structure. The reference count may be used to replicate VMs, as described below in detail.

The contents of data section 109I of each inode 109 may be interpreted differently depending upon the type of data container (inode) defined within the type field 109B. For example, the data section 109I of a directory inode structure includes meta-data controlled by the file system, whereas the data section of a "regular inode" structure includes user-defined data. In this latter case, the data section 109I includes a representation of the data associated with the data container.

Specifically, data section 109I of a regular inode data container may include user data or pointers, the latter referencing, for example, 4 KB data blocks for storing user data at a storage location at storage device 114. Each pointer is preferably a logical volume block number.

Inode structure 109 may have a restricted size (for example, 128 bytes). Therefore, user data having a size that is less than or equal to 64 bytes may be represented, in its entirety, within the data section of an inode. However, if the user data is greater than 64 bytes but less than or equal to, for example, 64 kilobytes (KB), then the data section of the mode comprises up to 16 pointers, each of which references a 4 KB block of data stored at a disk. Moreover, if the size of the data is greater than 64 kilobytes but less than or equal to 64 megabytes (MB), then each pointer in the data section 109I of the mode references an indirect mode that contains 1024 pointers, each of which references a 4 KB data block on disk.

Although storage system 108 is shown as a stand-alone system, i.e. a non-cluster based system, in another aspect, storage system 108 may have a distributed architecture; for example, a cluster based system that is described below in detail with respect to FIG. 2. The various aspects of the present disclosure are not limited to any specific storage system type.

Figure 1C:
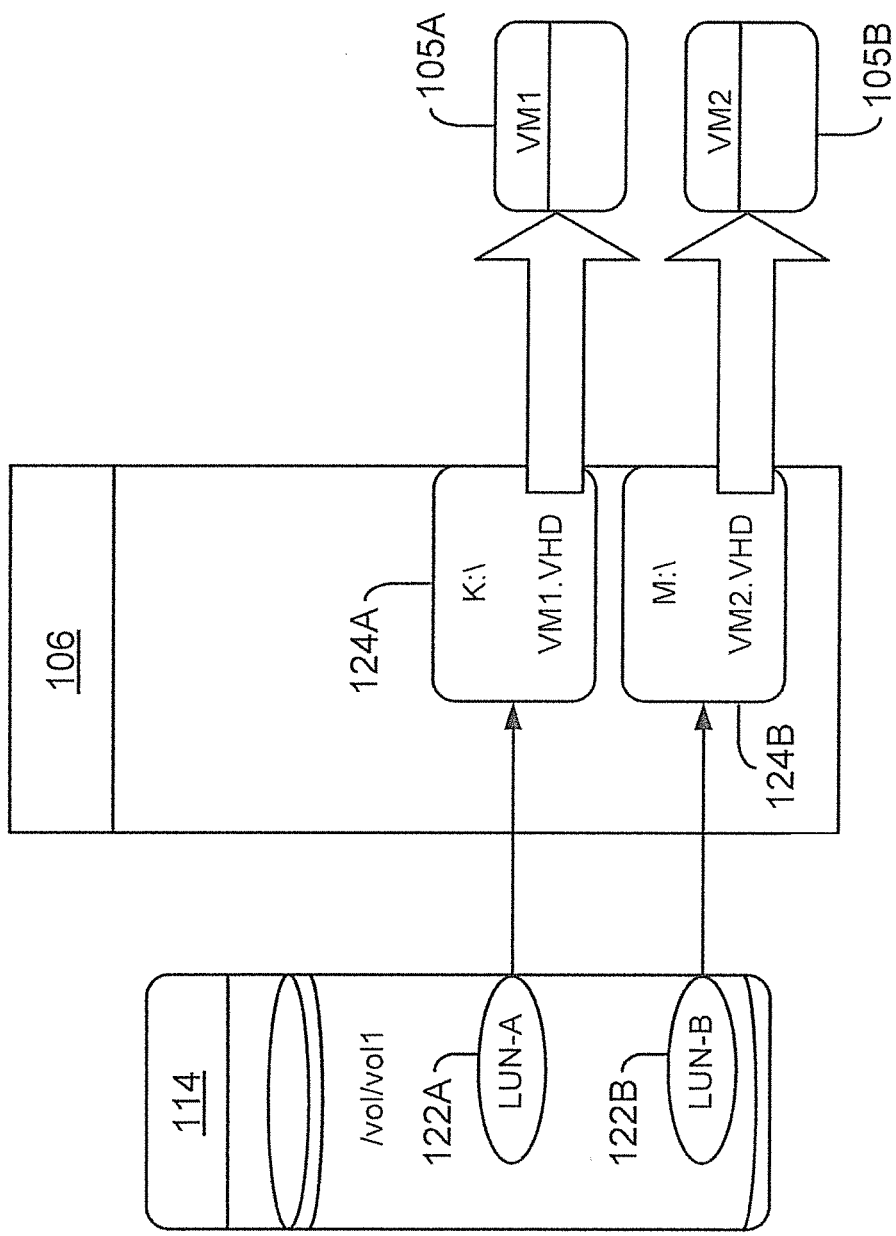
FIG. 1C shows an example of presenting storage to virtual machines, according to one aspect of the present disclosure.

Presenting Logical Storage to VMs: Before describing the details of the various aspects of the present disclosure, the following provides an example of presenting logical storage space to one or more VMs with respect to FIG. 1C. Storage operating system 107 typically presents storage space at storage device 114 as a virtual storage drive (for example, LUNs, virtual hard disks and any other format) to VMM 106. For example, LUN-A 122A and LUN-B 122B at storage device 114 for a storage volume labeled as "vol1" are presented to VMM 106 that hosts VMs 105A (VM1)-105B (VM2).

VMM 106 then creates a file system for example, a NTFS file system (used in a Windows® operating system environment) on the LUNs and generates one or more virtual hard drive (VHD) files for each LUN. The user is presented with a storage drive within a virtual machine. For example, the VHD file VM1.VHD 124A is created on LUN-A 122A and then presented as drive K:\ to VM1 105A. A user using VM1 105A uses K:\ to access storage space for reading and writing information. Similarly, VM2.VHD 124B is created on LUN-B 122B and appears as M:\ drive for VM 105B. A user using VM2 105B uses M:\ drive to store information. It is noteworthy that different operating systems may present virtual storage drives in different formats (for example, K:\; /mnt/driveK/ or any other format). The various aspects described herein are not limited to any particular format.

In some instances, VMM 106 does not create a file system for the LUNs and instead the LUNs are presented directly to the VM as a storage drive. The storage drives in such an instance may be referred to as "pass through" disks. The terms VHD and pass through disks as used herein for presenting a virtual storage drive to a user via a VM are used interchangeably throughout this specification.

Figure 1D:
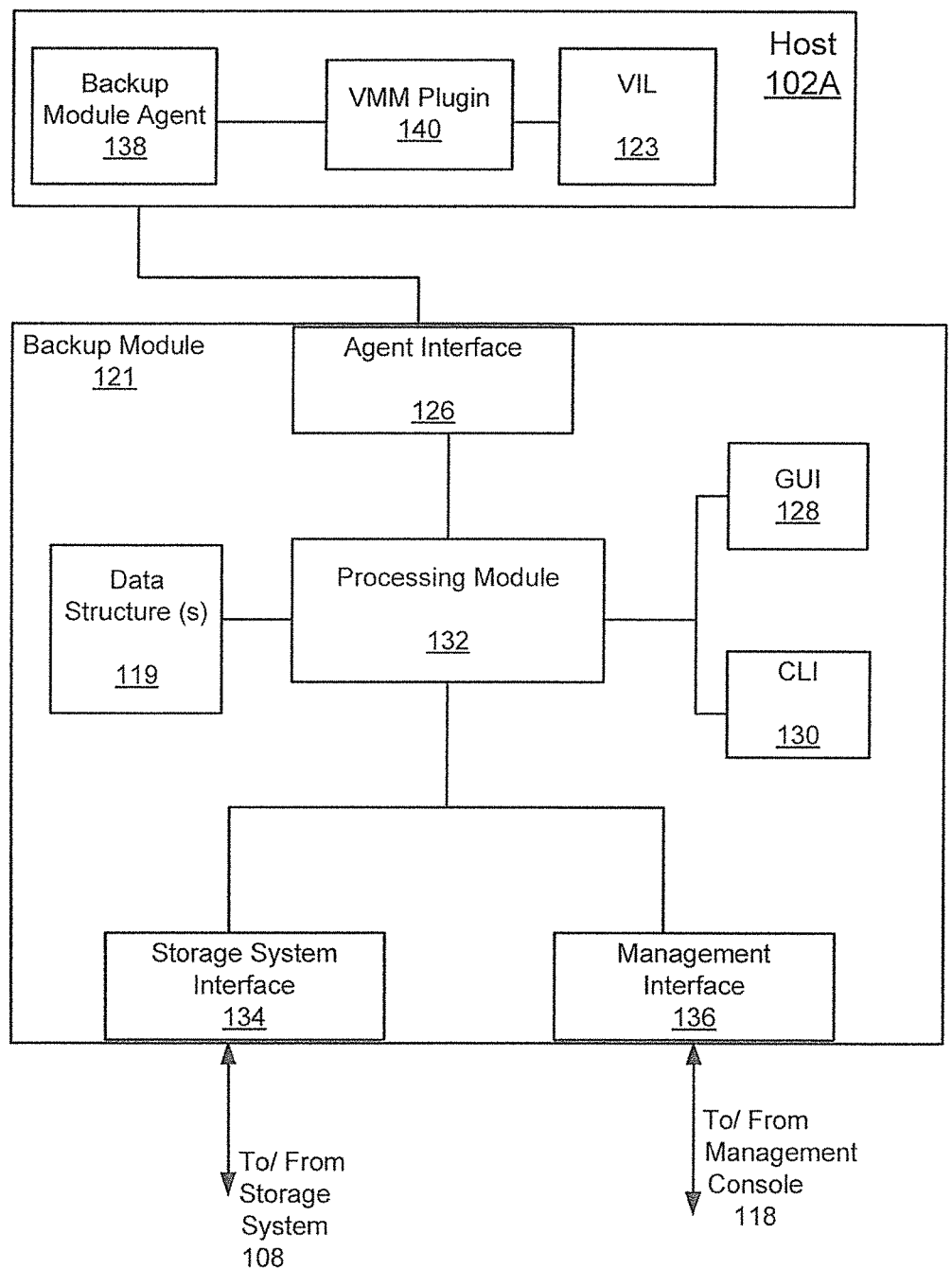
FIG. 1D shows a block diagram of a backup module, according to one aspect of the present disclosure.

Backup Module 121: FIG. 1D shows a block diagram of the backup module 121 interfacing with host system 102A and storage system 108, according to one aspect. The backup module 121 includes a processing module 132 that maintains the data structure 119 at a storage location. Data structure 119 may be used to replicate VMs, as described below in detail.

Processing module 132 interfaces with the storage system 108 via a storage system interface 134. The storage system 108 maintains the inodes and data associated with each VM. In one aspect, each data container for the VM is replicated as a SIS clone. This means that the original data container and the clone reference to the same physical location where the data for the data container is stored. Details of using SIS clones for replicating a VM are provided below.

The backup module 121 interfaces with the host system 102A via agent interface 126 that communicates with a backup module agent 138. A VMM plugin 140 interfaces with the backup module agent 138 and the VIL 123. The VMM plugin 140 is used to discover the different data containers that are replicated by the backup module 121. The discovery process is described below in detail with respect to FIG. 1E.

The backup module 121 may also interface with the management console 118 via a management interface 136. The management console 118 may be used to send management commands to the backup module 121, for example, a replication schedule to replicate VMs. The processing module 132 may also provide a graphical user interface (GUI) 129 and/or a command line interface 130 for receiving user requests or commands for replicating VMs.

Figure 1E:
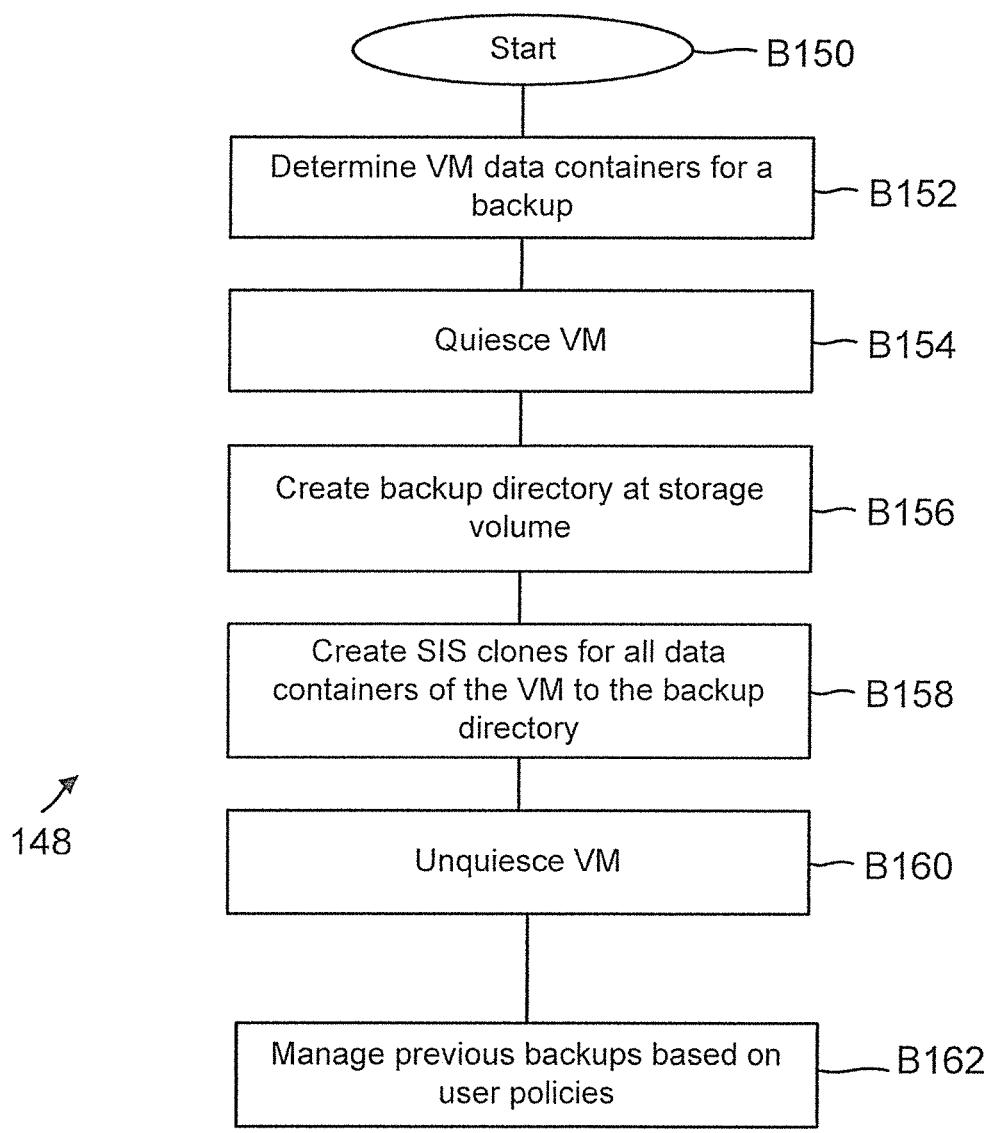
FIG. 1E shows a process flow for replicating a virtual machine, according to one aspect of the present disclosure.

Process Flow: FIG. 1E shows a process 148 for replicating VMs using the backup module 121, according to one aspect. The replication process begins in block B150, when one or more VMs 105A-105N has been initialized and is operational. Each VM is managed as a data container from the storage operating system 107's perspective. Each VM stores data in data containers (or files) based on the storage space that is presented to the VM. Data for the VM is stored at a storage volume and managed by the storage operating system 107 using modes. The replication process may start based on a user request or may be based on a configured schedule.

In block B152, the various data containers for a VM that need to be backed up are determined. In one aspect, VMM plugin 140 obtains information regarding various data containers from VIL 123 or any other entity. The adaptive aspects described herein are not limited to how information regarding the data containers may be obtained. The VM data container information is provided to the processing module 132. The data container information may be stored at data structure 119. As an example, data container information includes, the data container name, data container size, data container storage path, permissions associated with the data container and any other relevant information.

Before the VM and the data containers associated with the VMs can be replicated, the VM is quiesced in block B154 so that the VM is ready for replication and its data is in a consistent state. The VMM plugin 140 places the VM in an inactive state. A snapshot of the memory used by the VM may be taken by the VMM plugin 140. The snapshot is simply used as a starting point of the replication process, where all the VM data containers are replicated without taking a snapshot, as described below. The snapshot is provided a name and stored by the VMM plugin 140.

In block B156, the processing module 132 creates a replication directory (may also referred to as a backup directory) for the VM. The replication directory may be created at the same storage volume which is used for the VM by the storage system 108 to store data. The replication directory is used to store SIS clones of each data container of the VM from an active directory location. The active directory is the directory used for tracking the data containers, while the data containers are being used by the VM.

In block B158, a clone of each data container is generated. The clone is generated using a SIS cloning process. In the SIS cloning process, the clone uses the same inode that references the user data associated with a VM data container. The reference count at the mode is increased which means that the clone and the original data container reference to the same physical storage location where the data is stored.

Metadata associated with the replication is also stored at the replication directory. In one aspect, the metadata may be stored as a data container that includes a timestamp for the replication and a list of data containers with their storage paths that are replicated. Thus the metadata tracks the original and replicated data containers. Using the timestamp and the list of storage paths, the replicated data containers can be restored.

After the clones have been generated, in block B160, the VM is unquiesced by the VMM plugin 140. The snapshot created in block B154 is deleted and the VMS are made available for use i.e. placed in an active state. The replication directory is then used for storing the replicated data containers.

If there are previous replicated copies of the data containers, then they are handled in block B162. The previous backups are retained or deleted based on policies that are set for the VM. For example, a user may specify to retain five replicated copies at any given time. Then process 148 enables the user to retain five copies, each with individual time stamps and the associated metadata (i.e. data container file names and storage paths). The user is able to use any of the replicated copies to restore the original replicated data containers.

The adaptive aspects of the present disclosure have various advantages over conventional techniques that take a snapshot of an entire volume to replicate a VM. The various aspects described above generate clones of data containers that are used by each VM. This allows one to create tens of thousands of clones for replicating VMs and hence one is able to overcome the shortcomings of using conventional snapshot technology.

Clustered System: FIG. 2 shows a cluster based storage environment 200 having a plurality of nodes for managing storage devices, according to one aspect. Backup module 121 interfaces with various nodes in the storage environment 200 for replicating VMs and the associated data containers therewith, according to one aspect.

Storage environment 200 may include a plurality of client systems 204.1-204.N (or virtual machines 105A-105N), a clustered storage system 202 (similar to storage system 108), backup module 121, management console 118 and at least a network 206 communicably connecting the client systems 204.1-204.N and the clustered storage system 202. As shown in FIG. 2, the clustered storage system 202 includes a plurality of nodes 208.1-208.3, a cluster switching fabric 210, and a plurality of mass storage devices 212.1-212.3 (may be referred to as 212 and similar to storage device 114).

Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N (or the backup module 121) over the computer network 206, while the D-modules 216.1-216.3 connect to one or more of the storage devices 212.1-212.3. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 may be used to obtain replication schedules and manage VM replication described above.

A switched virtualization layer including a plurality of virtual interfaces (VIFs) 220 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Figure 2:
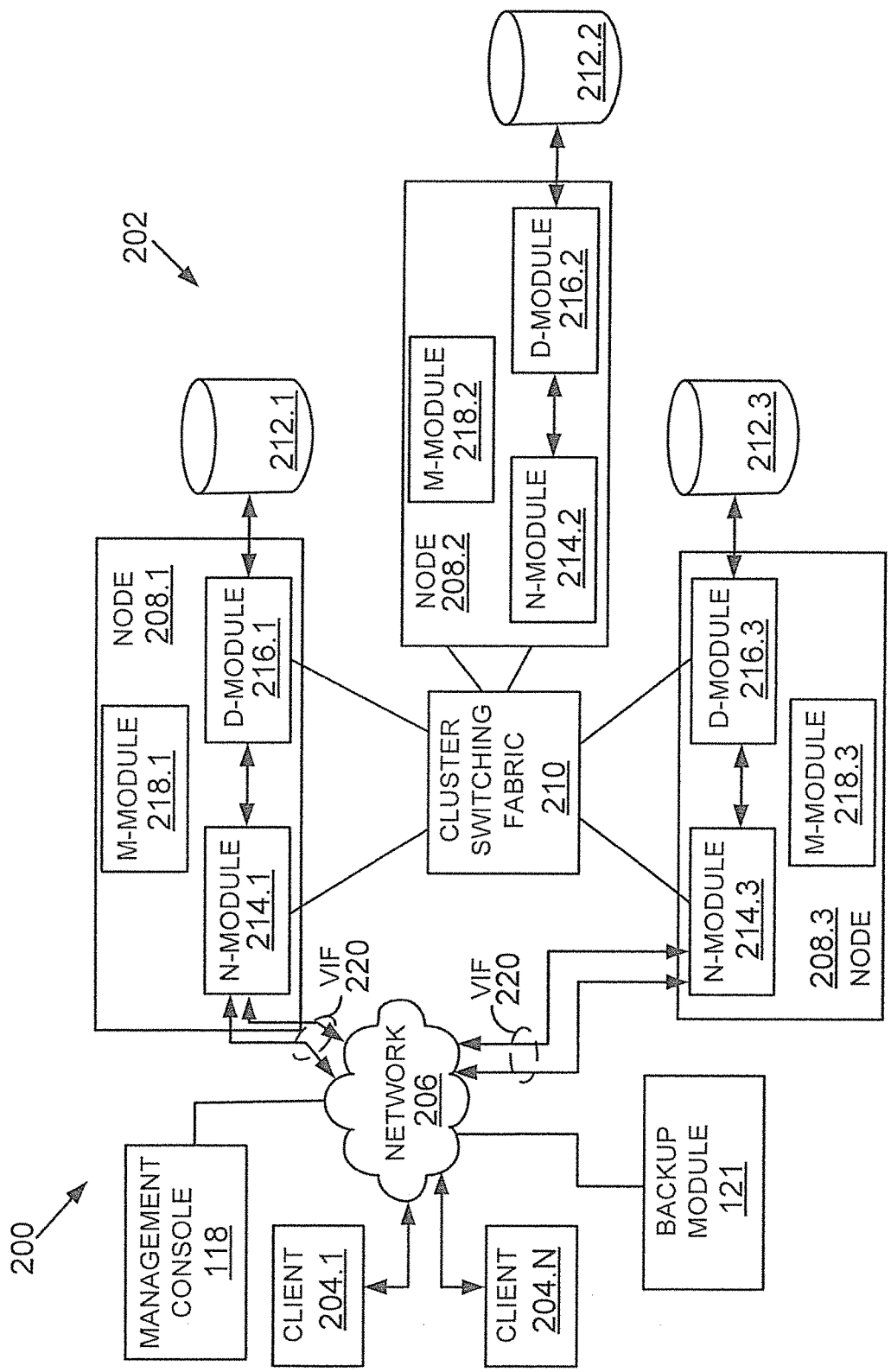
FIG. 2 shows an example of a clustered storage system, used according to one aspect of the present disclosure.

Although FIG. 2 depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules.

Each client system 204.1-204.N (or VM 105A-105N) may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 3:
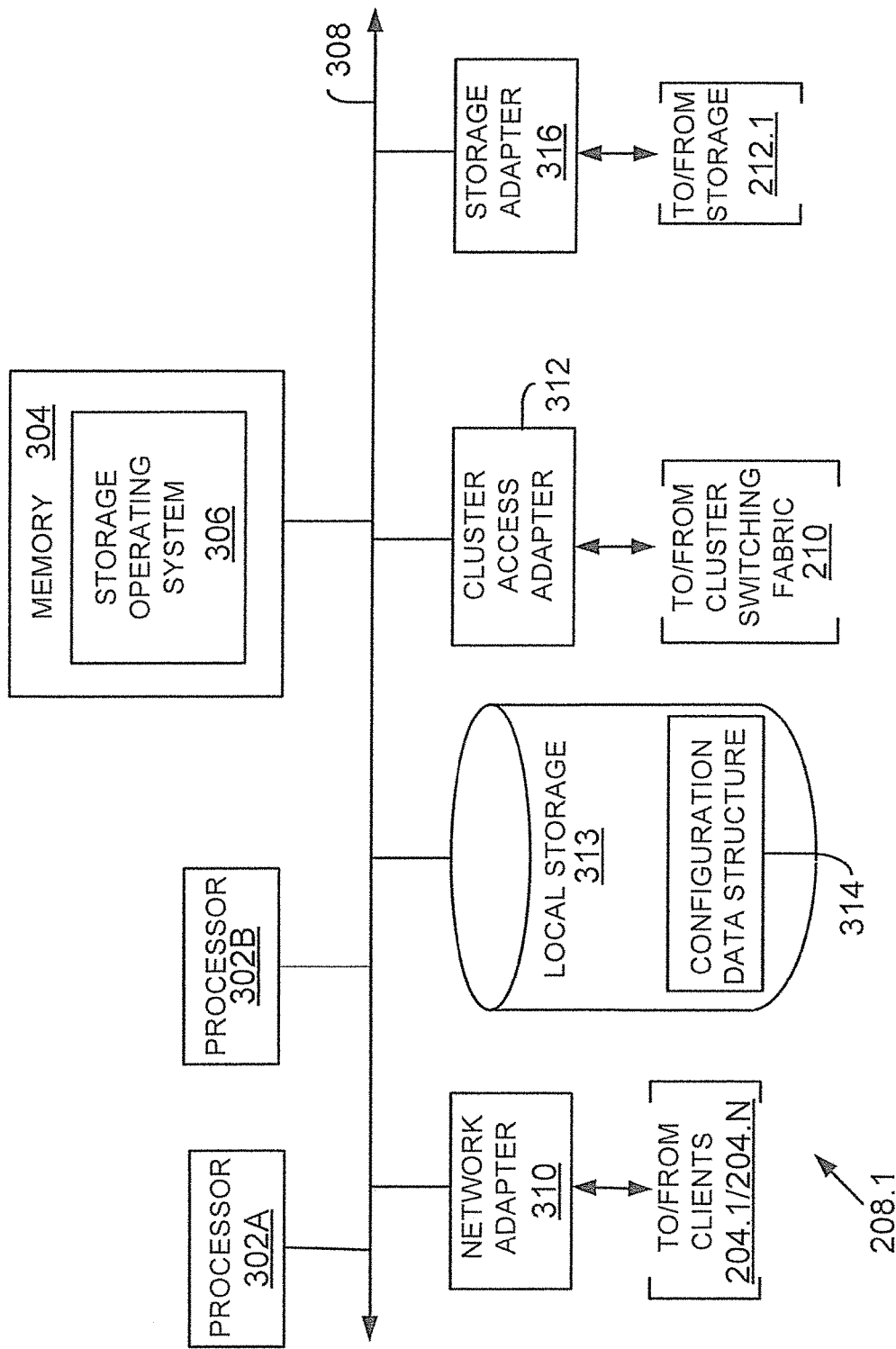
FIG. 3 shows an example of a storage system, according to one aspect of the present disclosure.

Storage System Node: FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. Node 208.1 may be used to manage the data container clones and mode structures for replicating VMs, as described above.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314.

The cluster access adapter 312 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 202.

Each node 208.1 is illustratively embodied as a dual processor storage system executing a storage operating system 306 (similar to 107, FIG. 1A) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures.

The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 306 portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network.

Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
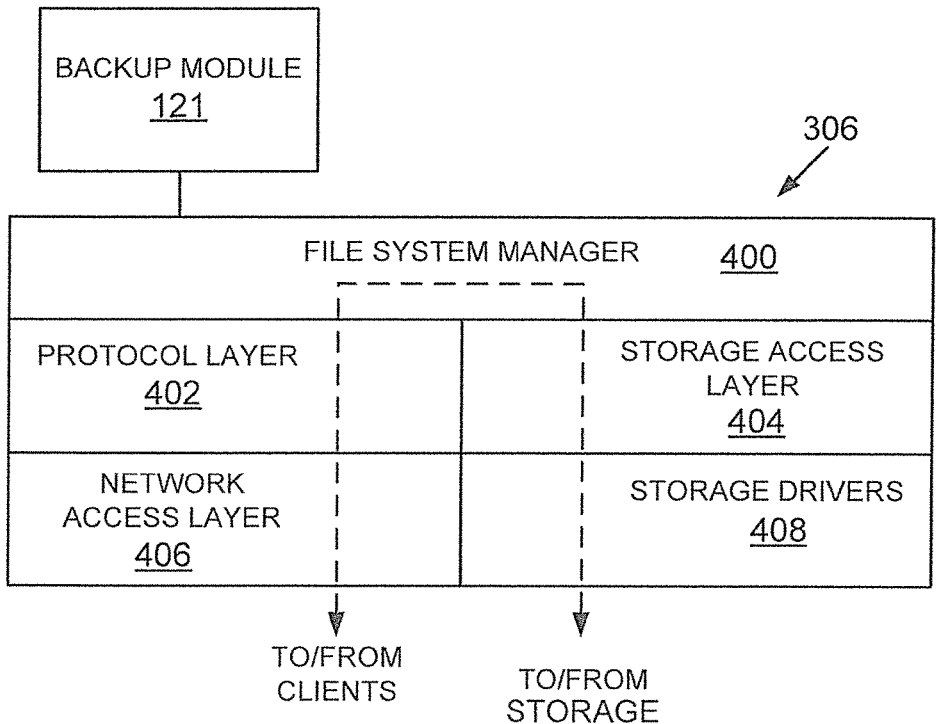
FIG. 4 shows an example of a storage operating system, used according to one aspect of the present disclosure.

Operating System: FIG. 4 illustrates a generic example of storage operating system 306 (or 107, FIG. 1A) executed by node 208.1, according to one aspect of the present disclosure. The storage operating system 306 interfaces with the backup module 121 for generating SIS data container clones for replicating VMs and their associated data containers, as described above.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operation, i.e. executes read/write operation on storage in response to client 204.1/204.N requests. File system manager 400 also maintains the inode structure 109 described above and used for creating data container clones.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 306.

The storage operating system 306 may also include a storage access layer 404 and an associated storage driver layer 408 to allow D-module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
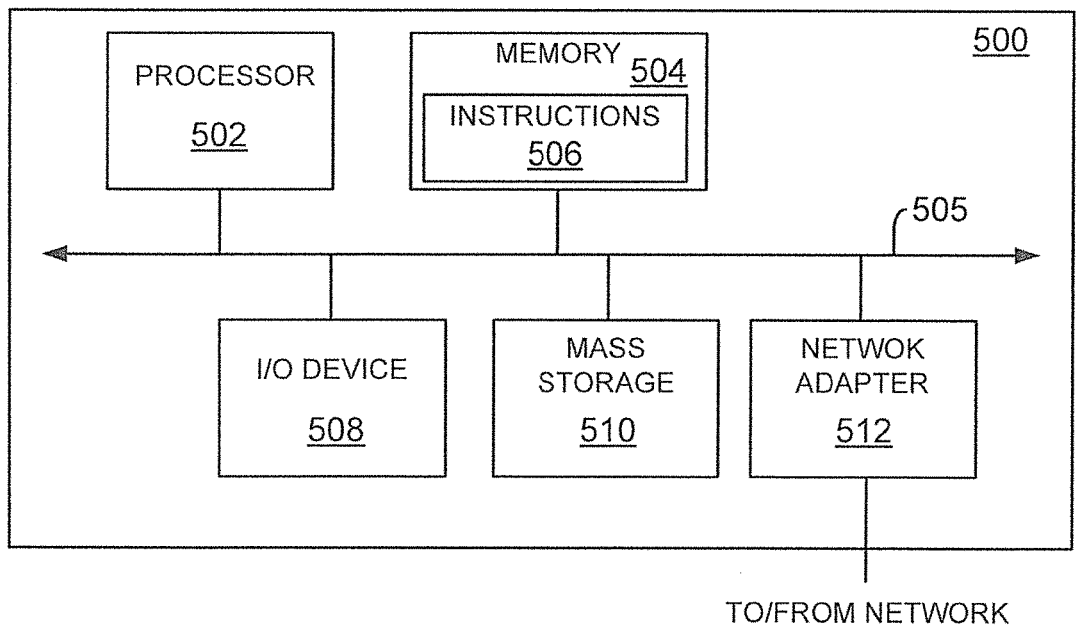
FIG. 5 shows an example of a processing system, used according to one aspect of the present disclosure.

Processing System: FIG. 5 is a high-level block diagram showing an example of the architecture of a processing system 500 that may be used according to one aspect. The processing system 500 can represent backup module 121, management console 118, client 116 or storage system 108. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps described above with respect to FIG. 1E may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services. Details regarding these layers are not germane to the aspects disclosed herein.

Thus, a method and apparatus for replicating a virtual machine have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
    determining by a virtual machine monitor plugin module for a replication operation, information regarding data containers associated with a virtual machine;
    placing the virtual machine in an inactive state by the virtual machine monitor plugin module for performing the replication operation to replicate the virtual machine and data containers associated with the virtual machine;
    creating a point in time copy by the virtual machine monitor plugin module of a memory used by the virtual machine for deletion after the replication operation is completed;
    generating a replication directory by a processor executable replication module for cloning each data container from an active directory to the replication directory, where the clone of each data container is a single instance storage clone that references to a physical storage location where data associated with each data container is stored; wherein the data containers are cloned individually rather than taking a snapshot of an entire storage volume used for storing the data containers; wherein the replication directory is stored using a same storage volume as the data associated with each data container, where the same storage volume is a logical storage object that is an abstraction of physical storage space, and the replication directory stores metadata for the replication operation, the metadata including a list of replicated data containers and their respective storage paths;
    deleting by the virtual machine monitor plugin module the point in time copy of the memory used by the virtual machine; and
    activating the virtual machine by the virtual machine monitor plugin module, after cloning is completed.

2. The method of claim 1, wherein the replication module interfaces with a virtual machine monitor to determine information regarding the data containers during a discovery operation.

3. The method of claim 1, wherein the replication module interfaces with a storage operating system that maintains a data structure which provides a reference to the physical location where data associated with each data container is stored.

4. The method of claim 3, wherein the data structure maintains a reference count denoting a number of instances the physical location is referenced.

5. The method of claim 1, wherein the metadata further includes a time stamp for the replication operation indicating when the replication operation took place.

6. The method of claim 5, wherein the metadata is used for restoring the replicated data containers.

7. A non-transitory, machine readable storage medium storing executable instructions, which when executed by a machine, causes the machine to perform a method for replicating a virtual machine, the method comprising:
    determining by a virtual machine monitor plugin module for a replication operation, information regarding data containers associated with a virtual machine;
    placing the virtual machine in an inactive state by the virtual machine monitor plugin module for performing the replication operation to replicate the virtual machine and data containers associated with the virtual machine;
    creating a point in time copy by the virtual machine monitor plugin module of a memory used by the virtual machine for deletion after the replication operation is completed;
    generating a replication directory by a processor executable replication module for cloning each data container from an active directory to the replication directory, where the clone of each data container is a single instance storage clone that references to a physical storage location where data associated with each data container is stored; wherein the data containers are cloned individually rather than taking a snapshot of an entire storage volume used for storing the data containers; wherein the replication directory is stored using a same storage volume as the data associated with each data container, where the same storage volume is a logical storage object that is an abstraction of physical storage space, and the replication directory stores metadata for the replication operation, the metadata including a list of replicated data containers and their respective storage paths;

deleting by the virtual machine monitor plugin module the point in time copy of the memory used by the virtual machine; and activating the virtual machine by the virtual machine monitor plugin module, after cloning is completed.

8. The storage medium of claim 7, wherein the replication module interfaces with the virtual machine monitor to determine information regarding the data containers during a discovery operation.

9. The storage medium of claim 7, wherein the replication module interfaces with a storage operating system that maintains a data structure which provides a reference to the physical location where data associated with each data container is stored.

10. The storage medium of claim 9, wherein the data structure maintains a reference count denoting a number of instances the physical location is referenced.

11. The storage medium of claim 7, wherein the metadata further includes a time stamp for the replication operation indicating when the replication operation took place.

12. The storage medium of claim 11, wherein the metadata is used for restoring the replicated data containers.

13. A system, comprising:
a processor executing instructions out of a memory to execute a method, the method comprising:
determining by a virtual machine monitor plugin module for a replication operation, information regarding data containers associated with a virtual machine;
placing the virtual machine in an inactive state by the virtual machine monitor plugin module for performing the replication operation to replicate the virtual machine and data containers associated with the virtual machine;
creating a point in time copy by the virtual machine monitor plugin module of a memory used by the virtual machine for deletion after the replication operation is completed;
generating a replication directory by a processor executable replication module for cloning each data container from an active directory to the replication directory, where the clone of each data container is a single instance storage clone that references to a physical storage location where data associated with each data container is stored; wherein the data containers are cloned individually rather than taking a snapshot of an entire storage volume used for storing the data containers; wherein the replication directory is stored using a same storage volume as the data associated with each data container, where the same storage volume is a logical storage object that is an abstraction of physical storage space, and the replication directory stores metadata for the replication operation, the metadata including a list of replicated data containers and their respective storage paths;
deleting by the virtual machine monitor plugin module the point in time copy of the memory used by the virtual machine; and
activating the virtual machine by the virtual machine monitor plugin module, after cloning is completed.

14. The system of claim 13, wherein the metadata further includes a time stamp for the replication operation indicating when the replication operation took place.

15. The storage medium of claim 14, wherein the metadata is used for restoring the replicated data containers.

16. The system of claim 13, wherein the replication module interfaces with the virtual machine monitor to determine information regarding the data containers during a discovery operation.

17. The system of claim 13, wherein the replication module interfaces with a storage operating system that maintains a data structure which provides a reference to the physical location where data associated with each data container is stored.

18. The system of claim 17, wherein the data structure maintains a reference count denoting a number of instances the physical location is referenced.

* * * * *